United States Patent [19]

Ookubo et al.

[11] Patent Number: 4,642,871
[45] Date of Patent: Feb. 17, 1987

[54] MANUFACTURING METHOD OF A CLUTCH COVER ASSEMBLY

[75] Inventors: Mamoru Ookubo, Neyagawa; Takayuki Iwasaki, Ikoma; Kenji Mieda, Hirakata, all of Japan

[73] Assignee: Kabushiki Kaisha Daikin Seisakusho, Osaka, Japan

[21] Appl. No.: 738,790

[22] Filed: May 29, 1985

[30] Foreign Application Priority Data

May 31, 1984 [JP] Japan .................. 59-112683

[51] Int. Cl.⁴ ................ B21D 39/00; B23P 11/00
[52] U.S. Cl. .................. 29/513; 29/243.52; 29/283.5; 192/70.18; 192/70.27
[58] Field of Search ............ 29/513, 512, 243.5, 29/243.52, 283.5; 192/70.27, 70.18, 79 B

[56] References Cited

U.S. PATENT DOCUMENTS 3,939,951  2/1976  Sink et al. ............ 192/70.18 X
4,109,368  8/1978  Hubbard et al. ........ 29/513 X
4,555,055  11/1985  Dixon ................ 192/70.27

FOREIGN PATENT DOCUMENTS 58-39820  5/1983  Japan .

Primary Examiner—Charlie T. Moon
Attorney, Agent, or Firm—Burns, Doane, Swecker & Mathis

[57] ABSTRACT

A manufacturing method of a clutch cover assembly comprising a first process in which an annular clutch cover body of a clutch cover is formed, a plurality of projections extending substantially radially inwardly from the inner periphery of the clutch cover body are formed and ends of said projections are bent so that the projections may extend in an axially inside direction of the clutch cover and toward a center of the clutch cover; a second process in which projection bodies between the clutch cover body and said projection ends are bent so that the projection bodies may extend in the axially inside direction of the clutch cover and toward the center of the clutch cover; and a third process in which a diaphragm spring and a pair of wire rings disposed at both sides of said spring for forming fulcrums for the spring are assembled to the projections, and then, the projection bodies are bent in a radially outward direction of the clutch cover and the projections ends are bent toward the inner peripheral portion of the clutch cover.

2 Claims, 9 Drawing Figures

MANUFACTURING METHOD OF A CLUTCH COVER ASSEMBLY

BACKGROUND AND SUMMARY OF THE INVENTION

The present invention relates to a manufacturing method of a clutch cover assembly used in a friction clutch of a diaphragm spring type for automobiles and others.

Generally, in a clutch of a diaphragm spring type, a diaphragm spring for forcing a pressure plate is supported by projections or tabs of a clutch over through wire rings which form fulcrums of the diaphragm spring. However, in this structure, a plurality of the projections are integrally formed at the inner periphery of the clutch cover and are bent to support the inner peripheries of a pair of the wire rings. Further, the free ends of the projections are bent to support the adjacent wire ring from the side opposite to the diaphragm spring. Therefore, in the conventional manufacturing work of the clutch cover assembly, there is such a problem that a number of the working processes is large. Further, in some cases, the wire rings can not be held accurately owing to the bending error in sizes and other reasons, and thus, intended smooth releasing operation can not be obtained.

Accordingly, it is an object of the invention to provide a manufacturing method, overcoming the above-noted disadvantages, in which a number of working processes is reduced and accuracy in sizes is increased.

According to the present invention, a manufacturing method of a clutch cover assembly comprises a first process in which an annular clutch cover body of a clutch cover is formed, a plurality of projections extending substantially radially inwardly from the inner periphery of the clutch cover body are formed and ends of said projections are bent so that the projections may extend in an axially inside direction of the clutch cover and toward a center of the clutch cover; a second process in which projection bodies between the clutch cover body and said projection ends are bent so that the projection bodies may extend in the axially inside direction of the clutch cover and toward the center of the clutch cover; and a third process in which a diaphragm spring and a pair of wire rings disposed at both sides of said spring for forming fulcrums for the spring are assembled to the projections, and then, the projection bodies are bent in a radially outward direction of the clutch cover and the projections ends are bent toward the inner peripheral portion of the clutch cover.

Other and further objects, features and advantages of the invention will appear more fully from the following description of the preferred embodiments of the invention.

DETAILED DESCRIPTION OF THE PREFERRED EMBODIMENTS

Figure 2:
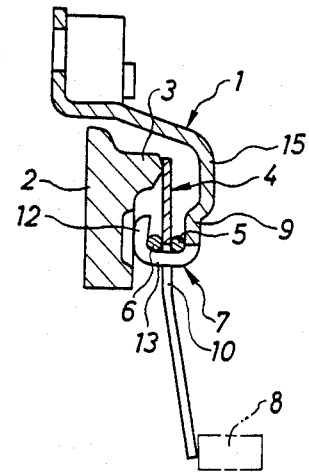
FIG. 2 is a schematic fragmentary sectional view of an assembled clutch cover assembly.

Initially, referring to FIG. 2, an assembled and completed structure will be detailed. A pressure plate 2 is covered from its outer peripheral side and rear side by a clutch cover 1, of which radially outer portion is fixed to a flywheel (not shown) of an engine. The pressure plate 2 is provided at the rear surface with protrusions 3, which outer peripheral portions of an annular diaphragm spring 4 contacts. A pair of wire rings 5 and 6 contact respective surfaces of a radially middle portion of the spring 4. The wire rings 5 and 6 form fulcrums for the spring 4, and are supported from radially inner sides and sides opposite to the spring 4 by projections 7 of the clutch cover 2.

A release bearing 8 is faced to the side opposite to the pressure plate 2 of the inner peripheral portion of the spring 4. The release bearing 8 is disposed around an output shaft (not shown) slidably only in an axial direction and is connected to a clutch pedal (not shown) through an appropriate link mechanism. When the clutch pedal is stepped on, the release bearing pushes the inner peripheral portion of the diaphragm spring 4, so that the pressing force applied by the spring 4 to the pressure plate 2 is released, and thus, the clutch is disengaged. When the clutch pedal is released, the spring 4 elastically forces the pressure plate 2, so that the plate 2 presses a friction facing (not shown) of a clutch disc against the flywheel, and thus, the clutch is engaged.

The projections 7 are circumferentially spaced and integrally provided at the inner periphery of an annular body 9 of a clutch cover 1, and extend toward the pressure plate 2 through openings 10 provided in the diaphragm spring 4. Free ends 12 of the projections 7 are bent nearly radially outwardly to support the wire ring 6 from the side opposite to the spring 4. A main body 13 of each projection 7, which is a part between the cover body 9 and the end 12 of the projection 7, extends substantially perpendicularly to the spring 4 through the opening 10 and supports the inner peripheries of the wire rings 5 and 6.

The above clutch cover assembly is manufactured in accordance with processes in FIGS. 1(A)–1(D).

(1) Blanking process (FIG. 1(A))

A blank of the cover body 9 and the projections 7 are formed. In this process, the whole of the body 9 and projections 7 are formed into a flat shape.

(2) Drawing process (FIG. 1(B))

A bent portion 15 is formed in the cover body 9. Simultaneously, the ends 12 of the projections 7 are bent so that the ends 12 are inclined radially inwardly and toward the inside of the clutch cover 1, i.e., toward the pressure plate 2 in FIG. 2, and an obtuse angle d is formed between the ends 12 and the body 13.

(3) Trimming process (not shown)

Above bent blank is trimmed.

(4) Re-striking (Bending) process (FIG. 1(C))

The projection bodies 13 are bent with respect to the cover body 9, so that the projection bodies 13 are inclined radially inwardly and toward the inside of the cover 1 with respect to the cover body 9 and an obtuse angle D is formed between each projection body 13 and the cover body 9. The projection ends 12 are projected radially outwardly away from the cover body 9 from the projection body 13.

(5) Piersing and lathing processes (not shown)

Piersing and cutting by a lathe are performed at predetermined portions.

Figure 1:
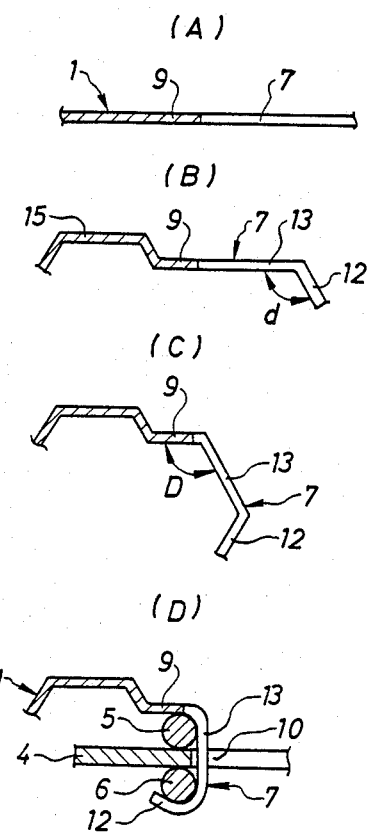
FIGS. 1(A)–1(D) are schematic fragmentary sectional views of a clutch cover assembly respectively in different processes according to a method of the present invention.

(6) Bending process (FIG. 1 (D))

The projections 7 are inserted into the openings 10 of the diaphragm spring 4 in a condition in which the wire rings 5 and 6 are disposed at the respective sides thereof. Then, the projection bodies 13 are bent radially outwardly to be substantially perpendicular with respect to the cover body 9. Simultaneously, the projection ends 12 are bent toward the spring 4 with respect to the projection bodies 13, so that an angle between each end 12 and the body 13 becomes a value substantially smaller than 90 degrees. Whereby, the wire rings 5 and 6 are held from the inner peripheral sides and the sides opposite to the diaphragm spring 4 by the projections 7 without a play.

Figure 3:
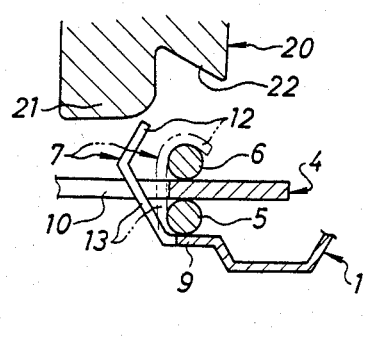
FIG. 3 is a schematic fragmentary sectional view of a bending machine.

This bending process is performed by a device shown in FIG. 3. The clutch cover 1 with which the diaphragm spring 4 and the wire rings 5 and 6 are assembled are supported by a lower die (not shown) with the projections 12 upward. Then, an upper die 20 is lowered. The die 20 ia provided with portions 21 for radially outwardly bending the projections 7 and a portion 22 for downwardly bending them. The bending portions 21 guide the ends 12 and the bodies 13 which are in the initial inclined position shown by solid line and bend them. The portion 22 will downwardly bend the ends 12, which are bent over the wire ring 6.

In the projections 7, which are formed as described above, since the bodies 13 were bent radially outwardly by the portions 21, the bodies 13 securely engage with the inner peripheries of the wire rings 5 and 6 without a play. Further, since the ends 12 were bent downwardly by the portion 22, the ends 12 axially securely hold the wire rings 5 and 6 and the diaphragm spring 4 without a play. Therefore, the spring 4 and the wire rings 5 and 6 are accurately positioned, and thus, in the completed structure, the spring 4 operates smoothly, resulting in an improved operation characteristic.

According to the invention, as stated hereinbefore, the projection ends 12 are inclined relatively to the projection bodies 13 to form the obtuse angle in the drawing process (a part of first process), then, the projection bodies 13 are inclined relatively to the cover body 9 to form the obtuse angle in the re-strike process (second process), and then, the projection ends 12 and the projection bodies 13 are bent to the intended positions in the bending process (third process). Therefore, the number of the working processes can be reduced and the assembling accuracy can be improved. The advantages of the present invention will be detailed further in comparison with an conventional method shown in FIG. 4.

Figure 4:
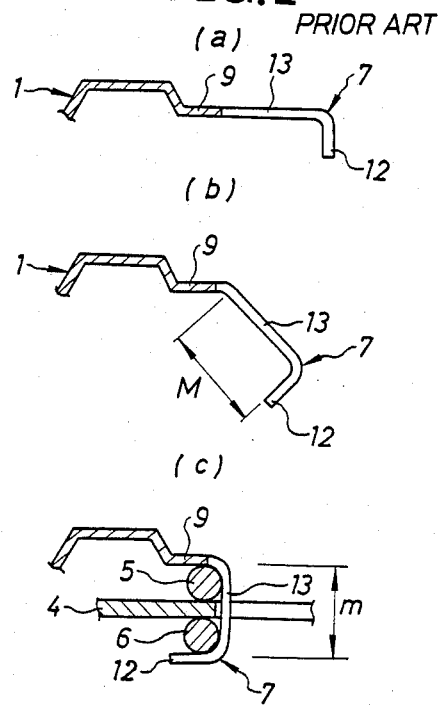
FIGS. 4(a)–4(c) are schematic fragmentary views of a clutch cover assembly respectively in different processes according to a conventional method.

The method in FIG. 4, which is described in a Japanese laid-open publication No. 58-39820, is as follows. Initially, as shown in FIG. 4(a), projection ends 12 are bent perpendicularly with respect to the projection bodies 13. Then, as shown in FIG. 4(b), the projection bodies 13 are bent relatively to the cover body 9 to form an obtuse angle. Then, as shown in FIG. 4(c), the spring 4 and the wire rings 5 and 6 are assembled, and the projection bodies 13 are perpendicularly bent with respect to the cover body 9.

In the conventional method, in order to hold the spring 4 and the wire rings 5 and 6 without a play, it is essential in the second process (FIG. 4(b)) to conform an length M of the projection body 13 to an axial length m of the diaphragm spring 4 and the wire rings 5 and 6. Therefore, high accuracy is required in each parts and portions, resulting in a high cost, and there is a large possibility that the parts can not be held accurately.

Conventionally, such method has also been used that projection bodies 13 are bent perpendicularly to a cover body before bending projection ends, than a diaphragm spring 4 and wire rings 5 and 6 are assembled, and then the projection ends 12 are bent. However, in this method in which the ends 12 are bent at the last process, special coining or the like for the ends 12 is required in a former process. Further, it is necessary to bend the bodies 13 and the ends 12 at the respectively different processes. Therefore, the number of the working processes is disadvantageouly larger by two than that in the present invention.

Although the present invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A method of manufacturing a clutch cover assembly comprising the steps of:

forming an annular clutch cover body of a clutch cover having a plurality of projections extending substantially radially inwardly from an inner periphery of the clutch cover body; bending ends of said projections at an angle to the radially extending projections so that the ends of the projections extend in an axially inward direction of the clutch cover toward a center of the clutch cover;

bending in the same direction of the bending of the projection ends projection bodies at an angle to said radially extending projections between the clutch cover body and said projection ends so that the projection bodies extend in the axially inward direction of the clutch cover toward the center of the clutch cover and the projection ends are displaced to extend in an axially and outward direction of the clutch cover body; and assembling over the ends and bodies of the projections of the clutch cover an annular diaphragm spring with a pair of wire rings disposed each on a corresponding side of said spring for forming fulcrums for the spring; and progressively bending the projection bodies in a radially outward direction of the clutch cover and then simultaneously bending the projection ends over and around an outermost wire ring toward the inner periphery of the clutch cover.

2. The method of claim 1 wherein, the projection end bending step forms the projection ends at an obtuse angle with respect to the radial direction of the clutch cover; said projection body bending step forming the projection bodies at an obtuse angle with respect to the radial direction of the clutch cover, so that the projection ends may project away from the clutch cover bodies and in an axially and radially outward direction of the clutch cover; and the bending steps are progressively accomplished by pressing a die having outwardly bending portions that push the surface opposite to the wire ring of the projection ends to move the projection ends and projection bodies radially outwardly, and the die including a downwardly bending portion for pressing the projection ends toward the diaphragm spring and into close contact between the ends and the wire rings.

* * * * *